US009556543B2

(12) United States Patent
Schatzmann

(10) Patent No.: US 9,556,543 B2
(45) Date of Patent: Jan. 31, 2017

(54) DEVICE FOR MACHINING REVOLVING FLATS USED IN A TEXTILE CARDING MACHINE

(71) Applicant: Maschinenfabrik Rieter AG, Winterthur (CH)

(72) Inventor: Hans-Peter Schatzmann, Uesslingen (CH)

(73) Assignee: Maschinenfabrik Rieter AG, Winterthur (CH)

( * ) Notice: Subject to any disclaimer, the term of this patent is extended or adjusted under 35 U.S.C. 154(b) by 240 days.

(21) Appl. No.: 14/218,050

(22) Filed: Mar. 18, 2014

(65) Prior Publication Data

US 2014/0260867 A1 Sep. 18, 2014

(30) Foreign Application Priority Data

Mar. 18, 2013 (CH) .................................... 00617/13

(51) Int. Cl.
*B23C 3/14* (2006.01)
*D01G 15/24* (2006.01)
(Continued)

(52) U.S. Cl.
CPC ................. *D01G 15/24* (2013.01); *B23C 3/13* (2013.01); *B23C 3/14* (2013.01); *B23Q 1/01* (2013.01);
(Continued)

(58) Field of Classification Search
CPC ........... Y10T 83/7487; Y10T 409/3042; Y10T 409/304256; Y10T 409/304312; Y10T 409/304368; Y10T 409/304424; Y10T 409/30448; Y10T 409/304536; Y10T 409/304592; Y10T 409/304648; Y10T 409/304704;Y10T 409/30476; Y10T 409/304816; Y10T 409/304872; Y10T 409/304928; Y10T 409/304984; Y10T 409/30504; Y10T 409/305096; Y10T 409/305152; Y10T 409/305208; Y10T 409/305264; B23C 9/00; B23C 2220/08; D01G 15/24
(Continued)

(56) References Cited

U.S. PATENT DOCUMENTS 3,868,101 A * 2/1975 Nozaki ................. B23Q 1/527 269/139
3,905,116 A * 9/1975 Roberts .................... G01B 5/02 33/555
(Continued)

FOREIGN PATENT DOCUMENTS

CN 2119285 10/1992
DE 634 651 8/1936
(Continued)

OTHER PUBLICATIONS

EP Search Report, Jul. 1, 2014.

*Primary Examiner* — Daniel Howell
*Assistant Examiner* — Nicole N Ramos
(74) *Attorney, Agent, or Firm* — Dority & Manning, P.A.

(57) ABSTRACT

A device and a method are provided for machining running surfaces on head end pieces of revolving flats. The device has a base frame with a longitudinal axis and is provided with clamping devices for fixing the revolving flat at at least two points distributed on the longitudinal axis. The device comprises two chip-removal machining devices which are arranged outboard the clamping devices viewed in the direction of the longitudinal axis. A sliding guide is provided for accommodating the clamping devices in the device.

6 Claims, 1 Drawing Sheet

3 6 4 2 3
7 7
A
5
8 10 9 1 8

(51) Int. Cl.
*B23Q 1/01* (2006.01)
*B23C 3/13* (2006.01)

(52) U.S. Cl.
CPC ....... *Y10T 83/7487* (2015.04); *Y10T 409/3042* (2015.01); *Y10T 409/304144* (2015.01); *Y10T 409/304256* (2015.01)

(58) Field of Classification Search
USPC .................................................. 409/139–158
See application file for complete search history.

(56) References Cited

U.S. PATENT DOCUMENTS 4,047,470 A * 9/1977 Lorenz ...................... B23C 3/14 409/157
4,197,043 A * 4/1980 Houghton ................. B23C 3/13 409/138
4,667,548 A * 5/1987 Astle ....................... B23B 5/165 269/152
5,951,220 A * 9/1999 Katsura ............... B21B 15/0085 409/132
6,357,976 B1 * 3/2002 Weidlich ................. B41C 1/045 101/32
6,453,528 B1 * 9/2002 Stobbe ...................... B23B 5/18 29/27 C
6,725,515 B2 * 4/2004 Lotz ....................... B22D 11/12 29/33 A
7,040,629 B2 * 5/2006 Horisberger ...... B23B 31/16129 279/121
7,448,120 B2 * 11/2008 Ohmori ................... B23C 3/002 269/258
2008/0045391 A1 * 2/2008 Martens ............. B23Q 17/2225 409/131

FOREIGN PATENT DOCUMENTS

DE 42 43 807 A1 6/1994
GB 20443 4/2015

* cited by examiner

DEVICE FOR MACHINING REVOLVING FLATS USED IN A TEXTILE CARDING MACHINE

FIELD OF THE INVENTION

The invention relates to a device and a method for machining running surfaces on head end pieces of revolving flats and for checking the linearity of revolving flats.

BACKGROUND

In a carding machine, the flat area together with the drum forms the main carding zone and has as its function the breaking down of tufts to form single fibers, the separation of dirt and dust, the elimination of very short fibers, the breaking down of neps, and the parallelization of the fibers. Because of their function, the flats become blocked with dirt and fibers and it is therefore necessary to clean them. For this reason, the revolving flat was developed, wherein the flats are held together by means of a chain or belt and combined to form an endless, rotating strip. During a rotation of the flats, also referred to as the flat passage, part of the flat is always in direct use opposite the drum fittings. The remaining part of the flat is transported back face upwards over deflector rollers and can be cleaned and, if necessary, ground during this phase.

A narrow gap, known as the carding gap, is formed between the fittings of the flat and the fittings of the drum. This is produced in that the revolving flats, guided by means of curved strips, so-called flexible arcs, are guided along in the circumferential direction of the drum at a distance from one another determined by these flexible arcs. In a revolving flat carding machine, the size of the carding gap lies between 0.10 to 0.30 mm for cotton or up to 0.40 mm for chemical fibers. Precise guiding of the revolving flats by the flexible arcs is therefore of central importance. The carding gap must also be of uniform size over the whole working width of a carding machine in order to achieve good carding performance. This places high demands on the linearity and the dimensional stability of the revolving flats.

The head end pieces of the revolving flats rest on the flexible arc on both sides of the carding machine. To enable these head end pieces to be accurately guided on the surface of the flexible arcs, the running surface of the head end pieces which faces the flexible arc is adjusted in shape to match the radius of the guide surface of the flexible arcs. The running surfaces of the head end pieces are subject to wear over an extended operating period. This is rectified by periodically re-machining the running surfaces. Revolving flats which have head end pieces with replaceable slide elements, so-called sliding shoes, are known from the prior art. However, when these slide elements are changed, it is also necessary to match the shape of their running surfaces to the flexible arc.

It is known from the prior art to machine the running surfaces of the head end pieces with a cylindrical milling cutter which is moved at right angles to the longitudinal axis of the revolving flat. DE 634 651 shows a device for grinding the contact surfaces at the ends of head end pieces with a grinding disc. With both methods, machining the running surfaces of the head end pieces leads to a flat shape of the running surfaces. At the same time, the flat running surface created by machining is parallel to the plane of the contact surface of the fittings. The disadvantage is that, in operation, the revolving flat with a flat running surface has to be guided over a flexible arc which has a radius. This results in a linear contact of the revolving flat on the flexible arc, which leads to inaccurate guiding of the revolving flat and increased wear of the running surfaces of the revolving flat.

DE 42 43 807 discloses a device for checking the flatness of a revolving flat. For this purpose, the flat bar with the running surfaces is placed on bearing blocks and measured at a plurality of measuring points over its length. The measurements are evaluated by a computer and the flatness of the revolving flat determined therefrom. A decision can be made relating to the further use of the revolving flat based on the evaluation.

SUMMARY OF THE INVENTION

An object of the invention is to create a device which enables the running surfaces of the revolving flats to be accurately shaped. A further object of the invention is to design the device in such a way that it is not necessary to re-clamp the revolving flat in order to determine the flatness of the revolving flat. Additional objects and advantages of the invention will be set forth in part in the following description, or may be obvious from the description, or may be learned through practice of the invention.

The objects are achieved by the characteristics of embodiments of the invention described herein.

In order to achieve the objects, a new type of device for machining running surfaces on head end pieces of revolving flats is proposed having a base frame with a longitudinal axis and with clamping means for fixing the revolving flat at at least two points distributed on the longitudinal axis. The device comprises two chip-removing machining means which are arranged outside the clamping means viewed in the direction of the longitudinal axis. A sliding guide is provided for accommodating the clamping means in the device.

The revolving flat to be machined is clamped in the device. At least two clamping devices are provided in the device for this purpose. The clamping devices are retained in the device in a sliding guide. The distance between the clamping devices is designed for revolving flats with a length of 60 inches. However, other lengths of revolving flat can also be machined by means of simple adjustments, for example revolving flats with a length of 40 inches. For this purpose, the device has a base frame to which the sliding guide is fixed. The clamping devices are retained in the sliding guide in such a way that they can be moved in an axis, the longitudinal axis of the device. When the revolving flat is fixed in the clamping devices, this also enables the revolving flat together with the clamping devices to be moved along the sliding guide in the direction of the longitudinal axis of the device. The movement off the revolving flat and the clamping devices in the sliding guides can be manual or assisted with the help of a drive.

Two chip-removing machining devices are provided on the base frame of the device outside the clamping devices viewed in the direction of the longitudinal axis of the device. One machining devices is arranged on each side of the device. As an example, grinding discs or milling cutters can be used as machining devices. Advantageously, form cutters are used for machining the running surfaces of the revolving flats. These form cutters are shaped in such a way that their geometry corresponds to a curved cylinder. The milling cutters are arranged with their axis perpendicular to the longitudinal axis of the device and therefore also perpendicular to the longitudinal extension of the revolving flat. The curvature or convexity of the form cutter corresponds to the radius of the flexible arc used in the carding machine. When the revolving flat is moved over and beyond the form cutter as a result of its movement in the sliding guides, the running surfaces are given a geometrical shape which corresponds to the form of the surface of the flexible arc.

Preferably, the machining devices are retained in the device in a stationary manner. As a result, the drives of the machining devices can likewise be fixed to the base frame of the device in a stationary manner. Suitable drives are electric motors as well as pneumatic or hydraulic drives. The type of drive must be matched to the machining devices used.

The clamping devices preferably have a height-adjustable mounting for the revolving flats and are movably retained on the sliding guide. The shape of the mounting for the removable flats is matched to the geometry and dimensions of the revolving flats. The tightening of the revolving flats can be achieved by tightening a clamping device by hand, but can also be effected by pneumatic or electrical elements. Other clamping elements known from the prior art, such as pneumatic clamping devices or self-clamping toggle-type fasteners for example, can also be used for clamping the revolving flats. The ability to adjust the height of the mounting for the revolving flats serves to define the machining depth by the machining devices. This ensures that revolving flats can be machined for different sets of flats on differently adjusted flexible arcs. Advantageously, the height adjustment is provided with a scale which enables both clamping devices to be set to exactly the required height. Widely different designs of revolving flat can be clamped in the device by simply changing the clamping means.

The clamping devices are retained in the sliding guide in such a way that only a movement in the longitudinal direction of the device is possible. As little movement as possible must be allowed in directions other than the longitudinal direction. The sliding guide can be designed as one or more rails which extend in the direction of the longitudinal axis of the device. The geometry of the rails must be designed in the usual way so that, when the clamping devices are inserted into the rails, only a movement of the clamping devices along the rails is possible. In a preferred embodiment, the clamping devices are provided with fixing devices, for example in the form of fixing screws or spring elements, which can be engaged and disengaged. By means of the fixing devices, the clamping devices can be fixed on the sliding guides in one position in order to simplify the fixing of the revolving flat.

Advantageously, the sliding guide is provided with adjustable stop points on both sides. The arrangement of the stop points is preferably designed to suit the length of the revolving flats. The stop points serve to limit the movement of the revolving flat along the sliding guide. This prevents the revolving flat being moved over and beyond the machining means further than the running surface to be machined.

The device is provided with a measuring device for checking the revolving flats for their further usability. For this purpose, the device has a measuring carriage which is movably attached to the sliding guide and has a measuring devices for determining the linearity of the revolving flat. The measuring carriage can also be attached to the device on a sliding guide in the form of an additional rail which is provided especially for the purpose. Advantageously, the sliding guide is designed in such a way that the clamping devices for the revolving flat and the measuring carriage can be moved thereon independently from one another. The measuring devices is moved manually or by means of a motor along the revolving flat and thus enables the linearity or convexity of the revolving flat to be determined. This is usually carried out by determining the distance, which varies over the length of the revolving flat, between the measuring devices and a defined surface of the revolving flat. The mounting surface for the fittings is preferably provided as the measuring surface on the revolving flat, as the mounting surface for the fittings substantially determines the carding gap after mounting the fittings.

In a preferred embodiment, the measuring devices includes a dial gauge for mechanical or digital measurement of the linearity along the longitudinal axis of the revolving flat. However, the measuring devices can also be designed in the form of electronic distance measurement, for example by means of a laser. When a dial gauge is used, the linearity of the revolving flat is determined by observation by the operating personnel and, in a simple embodiment, with the help of a drag indicator in the dial gauge. However, the measurement can also be evaluated electronically.

In the method for machining running surfaces on head end pieces of revolving flats with a longitudinal axis and with clamping devices for fixing the revolving flat at at least two points distributed on the longitudinal axis, the revolving flat is clamped in the clamping devices. The clamping devices are retained in the device on sliding guides so that they can be moved in the longitudinal axis. Together with the clamping devices, the revolving flat is then moved into a working range for machining the running surfaces by machining devices arranged outside the clamping devices. To check the linearity of the revolving flat, the clamping devices are fixed in a defined position and a measuring carriage attached to the sliding guide is moved along the longitudinal axis of the device in order to determine the linearity of the revolving flat.

BRIEF DESCRIPTION OF THE DRAWINGS

The invention is explained below based on an exemplary embodiment and clarified in more detail by means of drawings.

DETAILED DESCRIPTION

Figure 1:
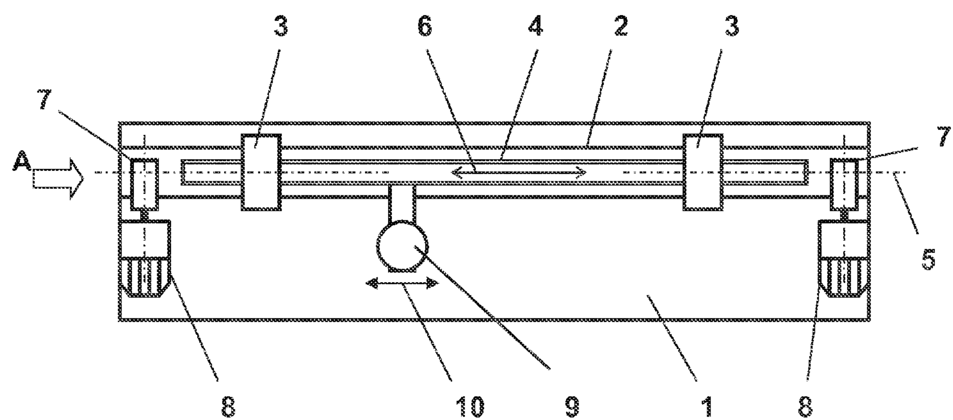
FIG. 1 is a schematic diagram of the device for machining revolving flats in a plan view.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a plan view of the device for machining revolving flats in a schematic diagram. A sliding guide 2 is attached to a base frame 1. The sliding guide 2 extends over the longitudinal axis 5 of the device or of the base frame 1. Two clamping devices 3 are retained by the sliding guide 2. The clamping devices 3 are movably arranged on the sliding guide 2 so that they can be moved in the direction of the longitudinal axis 5. A revolving flat 4 is accommodated and secured in the clamping devices 3. For this purpose, the clamping devices 3 are provided with a mounting and a clamping element. The shape and dimensions of the mounting are matched to the revolving flat 4 to be machined. This enables different designs or lengths of revolving flats 4 to be machined on the same device simply by changing the clamping devices 3. Embodiments of different kinds known from the prior art can be used for the clamping element.

The clamped revolving flat 4 with the clamping devices 3 can be moved to and fro along the longitudinal axis 5 as shown by the arrow 6. Two machining devices 7 are arranged outside the clamping devices 3 viewed in the direction of the longitudinal axis 5. The machining devices 7 are fixed to the base frame 1 of the device in a stationary manner. The machining devices 7 are in each case provided with a drive 8. An electric motor drive 8 of the machining devices 7 is shown in FIG. 1; however, other drive forms, such as a pneumatic drive for example, can also be used.

A measuring carriage 9 is in turn arranged on the sliding guide 2 between the machining devices 7. The measuring carriage 9 can be moved freely along the sliding guide 2 in both directions 10. The measuring carriage 9 includes a measuring device which serves to measure the linearity of the revolving flat 4. The measuring carriage 9 is guided along the stationary revolving flat. By this means, it can be established whether the linearity of the revolving flat 4 over its length still lies within a defined tolerance field for further use of the revolving flat 4.

Figure 2:
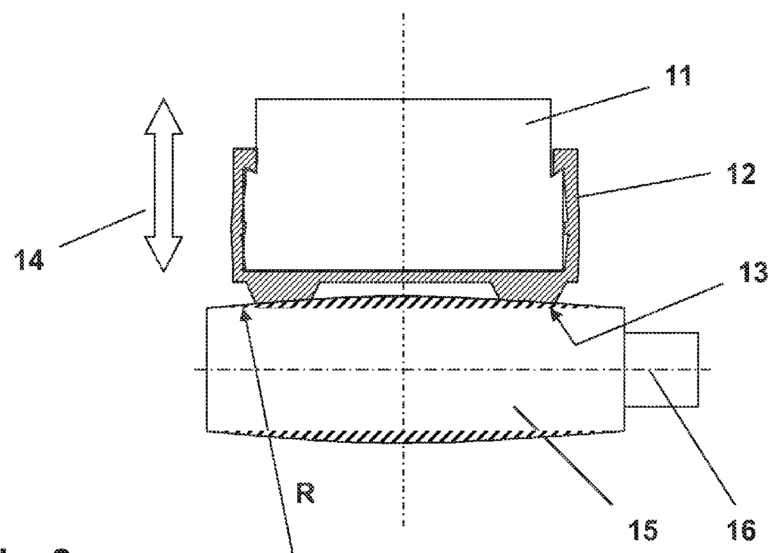
FIG. 2 is a simplified schematic diagram of an embodiment of the machining means in a view A according to FIG. 1.

FIG. 2 shows a simplified schematic diagram of an embodiment of the machining devices 7 in a view A according to FIG. 1. In the embodiment shown, a form cutter 15 is used as the machining devices 7. The drive has not been shown. The external contour of the form cutter 15 exhibits a curved shape with a convexity of a radius R. Here, the radius R corresponds to the radius of the surface of the flexible arc, over which the revolving flat or its running surface 13 is guided when in use.

The head end piece 11 of a revolving flat is shown above the form cutter 15. In the embodiment shown, by way of example, the head end piece 11 is fitted with a so-called sliding shoe 12. The sliding shoe 12 has the running surfaces 13 on which the revolving flat is guided on the flexible arc when in use. The distance between the revolving flat or the head end piece 11 of the revolving flat and the axis 16 of the form cutter 15 is adjusted with the help of the height-adjustable mounting of the clamping devices. The height adjustment is shown by the arrow 14. The running surfaces 13 are machined if the revolving flat with the head end piece 11 and the sliding shoe 12, which is fixed thereto, is now moved over and beyond the form cutter 15 towards the observer.

Modifications and variations can be made to the embodiments illustrated or described herein without departing from the scope and spirit of the invention as set forth in the appended claims.

The invention claimed is:

1. A device for machining running surfaces on head end pieces of revolving flats used on a carding machine, the device comprising:

a base frame with a longitudinal axis;

clamping devices arranged on a sliding guide and disposed to fix the revolving flat at two points along the longitudinal axis of the base frame;

a machining device disposed outboard of each clamping device along the longitudinal axis of the base frame, the machining devices fixedly mounted directly to the base frame so as to be non-movable relative to the base frame;

each machining device comprising a milling form cutter arranged with their axis perpendicular to the longitudinal axis of the base frame and a longitudinal axis of a revolving flat fixed by the clamping devices;

the machining devices fixed at a height relative to the clamping devices so that a revolving flat held by the clamping devices moves longitudinally along the sliding guide above the machining devices; and the clamping devices being height adjustable relative to the sliding guide so as to lower a revolving flat held by the clamping devices onto the machining devices.

2. The device as in claim 1, wherein the sliding guide comprises stop points to accommodate the length of revolving flat and limit movement of the revolving flat on the sliding guide.

3. The device as in claim 1, further comprising a measuring carriage movably attached to the sliding guide, the measuring carriage comprising a measuring device that determines linearity of the revolving flat.

4. The device as in claim 3, wherein the measuring device comprises a dial gauge for mechanical or digital measurement of the linearity of the revolving flat.

5. A method for machining running surfaces on the head end pieces of revolving flats on a base frame having a longitudinal axis, the method comprising:

fixing the revolving flat with clamping devices at two points along the longitudinal axis of the base frame, the clamping devices and revolving flat arranged on a sliding guide;

moving the clamping means and revolving flat along the sliding guide into working range of machining devices arranged outboard of the clamping devices, wherein the machining devices are fixed in position relative to the clamping devices such that the head end pieces of the revolving flats are conveyed above the machining devices; and machining the running surfaces with the machining devices by vertically adjusting the clamping devices to lower the head end pieces onto the machining devices.

6. The method as in claim 5, further comprising determining the linearity of the revolving flat with a measuring device on measuring carriage attached to the sliding guide.

* * * * *